US007107814B2

(12) United States Patent
Winterhalter et al.

(10) Patent No.: US 7,107,814 B2
(45) Date of Patent: Sep. 19, 2006

(54) PNEUMATIC PRECISION PLIERS

(75) Inventors: Peter Winterhalter, Schorndorf (DE); Ulrich Meier, Wädenswil (CH)

(73) Assignee: Hans Oetiker AG, Maschinen und Apparatefabrik, Horgen (CH)

( * ) Notice: Subject to any disclaimer, the term of this patent is extended or adjusted under 35 U.S.C. 154(b) by 193 days.

(21) Appl. No.: 10/311,365

(22) PCT Filed: May 22, 2001

(86) PCT No.: PCT/CH01/00313

§ 371 (c)(1),
(2), (4) Date: Aug. 11, 2003

(87) PCT Pub. No.: WO01/96071

PCT Pub. Date: Dec. 20, 2001

(65) Prior Publication Data

US 2004/0010899 A1 Jan. 22, 2004

(30) Foreign Application Priority Data

Jun. 14, 2000 (EP) ................................. 00112559

(51) Int. Cl.
*B21J 15/34* (2006.01)
*F15B 15/14* (2006.01)
*F16J 1/00* (2006.01)

(52) U.S. Cl. ............... 72/453.07; 72/391.2; 72/453.16; 29/243.53

(58) Field of Classification Search ............. 72/453.02, 72/453.06, 453.07, 453.16, 391.2, 391.4; 29/243.53
See application file for complete search history.

(56) References Cited

U.S. PATENT DOCUMENTS

| | | | | |
|---|---|---|---|---|
| 3,457,763 | A * | 7/1969 | Freeman | 72/453.07 |
| 3,523,441 | A * | 8/1970 | Bell et al. | 72/453.07 |
| 3,714,810 | A * | 2/1973 | Boyd | 72/391.2 |
| 4,062,217 | A * | 12/1977 | Ebbert et al. | 72/391.4 |
| 4,296,677 | A | 10/1981 | Little | |
| 4,770,085 | A | 9/1988 | Grigoriev et al. | |
| 5,904,358 | A | 5/1999 | Hosono et al. | |
| 5,904,440 | A | 5/1999 | Sims | |
| 6,711,797 | B1 * | 3/2004 | Bennett et al. | 72/20.1 |

FOREIGN PATENT DOCUMENTS

| | | |
|---|---|---|
| DE | 1 060 335 | 10/1958 |
| DE | 89 00 250 U | 2/1989 |
| DE | 91 11 366.0 | 12/1991 |
| DE | 296 21 818 U1 | 2/1997 |
| DE | 299 13 762 U | 3/2000 |
| EP | 0 135 386 | 3/1985 |
| EP | 0 997 647 A | 5/2000 |
| FR | 2 679 607 A | 1/1993 |

* cited by examiner

*Primary Examiner*—David B. Jones
(74) *Attorney, Agent, or Firm*—Pearne & Gordon LLP

(57) ABSTRACT

The invention relates to a device for pneumatically operating a tool which can be driven by means of pressure, such especially, pneumatic pliers. The device has a cylinder comprising one or more pneumatically operated, nonpositively fitted pistons arranged in a row, for generating a translatory force. The respective piston rods of the pistons are sealed against the preceding piston and guided in cylinder covers by means of a seal, such as a lip seal. Components such as a wedge piston are functionally connected to the pistons, said wedge piston being coupled to a cuneiform wedge, for transferring the translatory force and for operating the tool. The pistons are supported by at least one piston guidance strip, in the direction against the inner wall of the cylinder.

10 Claims, 2 Drawing Sheets

PNEUMATIC PRECISION PLIERS

Figure 1:
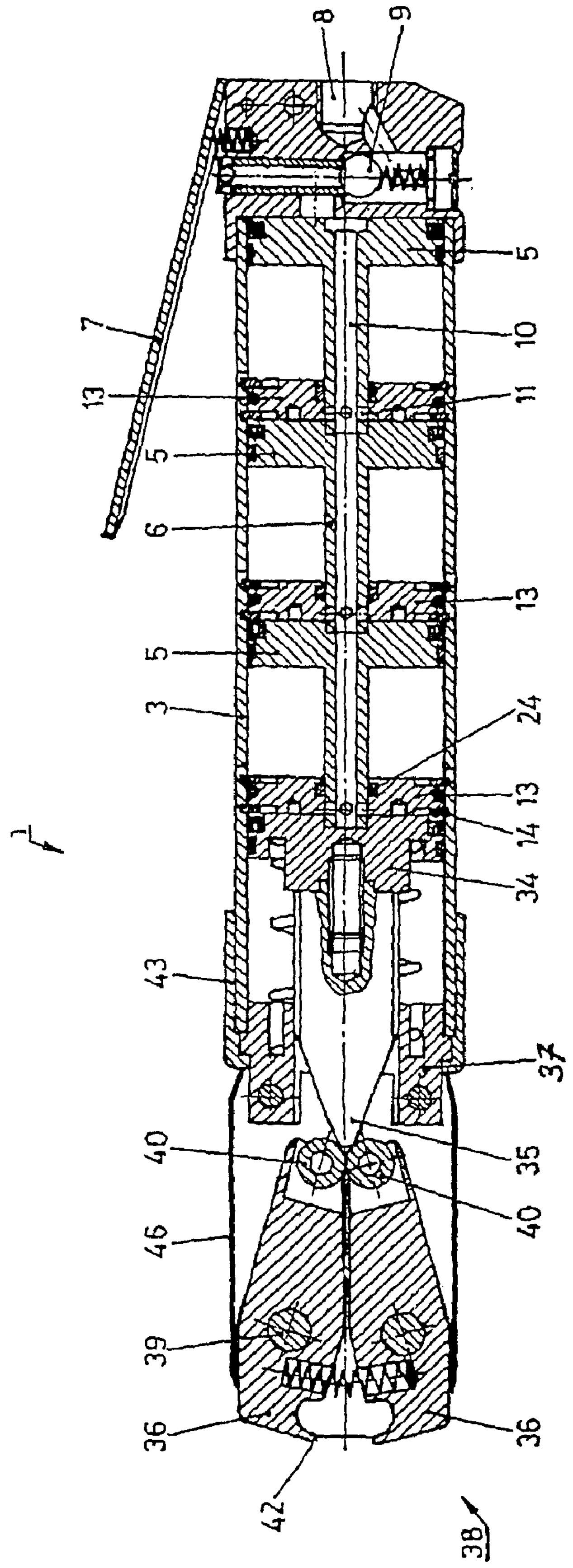

This invention relates to a device for pneumatically operating a tool, which can be driven by means of pressure as well as to pneumatic pliers.

Pneumatic pliers for compressing and clamping of locking rings, bolts, cable lugs, hose clamps, etc. are known. Pneumatic pliers are typically known in the automobile industry. In the automobile industry, these pliers are used for clamping locking rings in the assembly of hoses, bellows etc. to support universal joints and the like.

Pressure pliers for springs are described in a German patent registration DE 37 42 78211 with a valve controlled pressure connection and a wedge-shaped forward feed element.

In the a German patent publication DE89 00 250.4, a similar pressure plier is described, in which serially arranged several pistons are provided for increasing the thrust, where the piston rod of each individual piston is guided into a cylinder wall. Similarly, more pressure pliers comprising pressure pistons arranged in line are described in German patent registrations DE 195 19 543 and DE-GM 295 09 976.

The principle of increasing force through several non-positively fitted pistons for generating a translatory force has already been known for a long time, such as described, for example, in an European patent registration EP 0 997 647 and a German patent publication DE-GM 91 11 366.0.

The transference of the translatory force, especially in pneumatic pliers, such as for example, in the above mentioned pressure pliers, occurs in an arc-shaped force component in the plier head through the use of a wedge shaped feed tool. The compression force on the jaws of the plier is dependent, on the thrust of the feed tool.

Conventional devices for pneumatically operating a tool with the current state of technology exhibit strong dispersions of the compression forces; however, such devices generally do not maintain their compression force at a constant pressure and lose their compression force during the life. Another disadvantage of the conventional compression pliers are that they are not practically maintenance free.

It is therefore that a task of this invention is to create provide pneumatically operated pliers of the known type without the above disadvantages.

In accordance with the invention, this appointed task is achieved using a device for pneumatically operating a tool according to the claims.

A device of the present invention is proposed for the pneumatic operation of a tool, such as in particular, a pneumatic plier, comprising a cylinder with at least two pneumatically operated non-positively fitted pistons arranged in line for generating a translatory force, the respective piston rods of each piston as well as one forward feed element or elements actively bound to the pistons for the operation of the tool are held and guided by a guidance ring or more precisely by a cylinder wall. Furthermore, in accordance with the inventions it is proposed that two rings, each peripherally encompassing the outside of the piston or pistons, are provided to seal against the inner wall of the cylinder tube.

According to a variation on the execution of this invention, at least one of the rings is a piston guidance strip.

According to a further variation on the execution of the present invention, at least one of the rings is a lip seal.

The lip seals generate less static friction as well as lower dynamic friction. The piston guidance strips avoid contact between the piston and the cylinder, or more precisely, the piston head or piston face and the cylinder, and thus contribute to the smooth running of the piston. Ultimately these measures contribute to the device being maintenance free in accordance with the invention.

In order to guarantee the translatory force constant in the serially arranged individual pistons the row of pistons is separated from the foremost piston and sealed using a sealing element, for example an o-ring.

Other preferred variations of execution of the device, in accordance with the invention, are described in the claims. The device in accordance with the invention is especially suitable for pneumatic pliers for the placing, pressing or clamping of locking rings, bolts, cable lugs, hose clamps and similar items.

The great advantage of the device in accordance with the invention lies in that the translatory force remains constant with constant pneumatic pressure. The result is a constant pressing force with structurally similar pliers and with the same pneumatic pressure. Finally, the pressing forces remain constant throughout the entire life of the device proposed in accordance with the invention.

By the fact that the tool to be operated can be fitted, preferably removeably, to the device, the device in accordance with the invention is also universally usable for the operation of pneumatic tools. In other words this invention is not limited to plier tools, but may also be used for any other tools, which can be operated by pneumatically operated forward feed elements and by using translatory force.

The invention is now explained in the following in more detail with reference to the enclosed figures.

Figure 2:
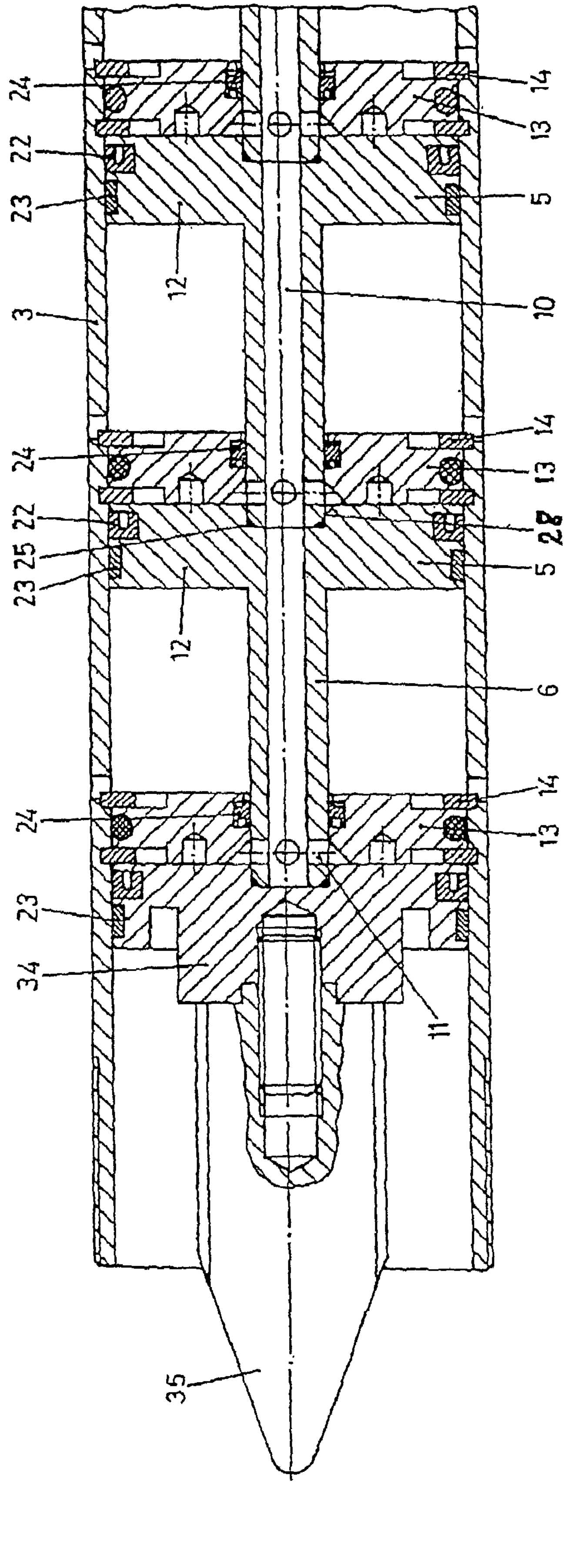

FIG. 1: shows in a longitudinal section, pneumatic pliers modeled in accordance with the invention and FIG. 2: shows as an enlargement, a section of the drawing in FIG. 1.

In a longitudinal section FIG. 1 shows pliers (1) which are pneumatically operable and can be driven by means of pressure for the purpose of building pipe clamps, hose clamps, locking rings, etc. In a cylinder (3) several pistons (5) are arranged in series, or more precisely, in a line one behind the other. The advantage of these pistons arranged in a line is an increase in the force, because the translatory force that can be generated is significantly higher than with the use of a single piston. One reason for this is the enlargement of the piston surface.

A connection (8) is provided at the back end of the hand operable pneumatic pliers for connecting the pliers to a pressure medium, such as for example to compressed air, where the pressure supply can be opened using a valve lever (7) for the activation of a valve (9) or more precisely be deventilated. The individual pistons (5) comprise a connecting passage (10) through the piston rods (6) for the passing through of the pressure medium. Exit openings (11) are provided in the area of the front side end of the piston rods (6) and are aligned radiating outwards for the pressurized air to exit and for the activation of the next piston (5) in the direction of the plier tool. The next piston in the sequence (6) is driven forwards by the air pressure and the pressurized air passing through the connecting passage of the next piston rod in the sequence is repeated in an analogous fashion.

There are stem holes (28) in the piston sequence (5, 34) for reliable non-tilting, feeding in of the piston rods into the next piston, which are sealed using an o-ring (25). The cylinder lids (13) which are securely positioned using sealing rings (14), serve for fluid separation of the individual pistons and are sealed with a sealed scraper ring (24), so that each piston with its cylinder lid that belongs to it (13) constitutes a fluid unit.

The so-called wedge piston (34) follows the leading piston (5) in the direction of the plier tool, an arc-shaped forward feed element (35) is provided on the front side of this piston to operate the head of the pliers (38). Both of the jaws of the pliers (36), lodged for example in bolts (39) are dispersed using the forwards circulating piston which uses the pressurized agent, such as for example pressurized air, in the area at the back while the piston surface moves between two rolls (40). Simultaneously, both of the jaws of the pliers (36) are moved together in the direction of closure at the front, for example, for the clamping of a clamp or more precisely for the pressing of lug clamps or similar items through operation of the pliers (42).

The head of the pliers (38) is preferably bound using a union or swivel joint (43) which is interchangeable with the cylinder (3). In addition, the jaws of the tongs (36) are protected along the side against contact (accident protection) or dirt accumulation using cover plates (46).

Now there will be more detail on the characteristics of the essentials of the invention with the help of a section from FIG. 1 in the longitudinal section of FIG. 2. So the piston (5) comprises piston packing (22) as well as a piston guidance strip (23) against the cylinder tube wall (3). The piston packing (22) is preferably a so-called lip seal. The use of lip seals in particular produces low friction as well as lower dynamic friction. The piston guidance strip (23) avoids contact of the piston with the cylinder tube and in this way contributes to the smooth running characteristic of the pistons and further leads to freedom from maintenance of the plier tool proposed in accordance with the invention.

Another ingenious characteristic lies in the use of a lip seal (24), using which the piston rod (6) is sealed from the piston lid (13). Furthermore, the piston rod (6) reaches up into the piston head (12) and comprises an additional seal (25), such as for example, a so-called o-ring, in the edge area of the front end. This measure leads to constant translatory force at constant pneumatic pressure.

Additionally, parts analogus to FIG. 1 are shown in FIG. 2 with the same reference numbers so there is no need for a repetition of the functionality of the pressurized device.

With regard to the pneumatic pliers shown in FIGS. 1 and 2 this is naturally only a single example, which should serve for a better explanation of this invention. The invention is in no way limited to pneumatic pliers and instead relates to all sorts of pneumatically operable tools, which can be driven by means of pressure, which comprise a thrustor pipe with one or more pneumatically operated, non-positively fitted pistons arranged in line for generating a translatory force, as described in accordance with the invention. In FIGS. 1 and 2 importance is particularly placed on the explanation of the characteristics in accordance with the invention and all characteristics known from the state of technology, construction parts and similar for devices of the type described can be combined in any number of ways in accordance with the characteristics fundamental to the invention. The further development of the device in accordance with the invention will not be dealt with here, such as for example, electronic control, the installation of monitoring sensors, the automated operation of the device in accordance with the invention, the choice of materials for the device in accordance with the invention if this should be steel, aluminum or if need be partially using strengthened polymer materials etc.

By interchanging the plier tool the device shown in FIGS. 1 and 2 may be used as any other tool, which can be driven by means of pressure such as, for example, as a boring tool, a punching or cutting tool, a screwing tool etc.

Legend for the Figures:

1 pneumatic pliers
3 cylinder
5 pistons
6 piston rods of the pistons 5
7 valve lever
8 opening for the pressure medium
9 valve
10 connecting passage in the piston 5
11 outlets
12 piston head
13 cylinder cover
14 sealing ring
22 piston packing (between piston 5 and cylinder 3)
23 piston guidance strip (for guidance)
24 seal-scraper ring (sealing between the piston rod of the piston 5 and the cylinder lid 13)
25 seal between the piston rod of the preceding piston in the row of pistons, e.g. o-ring
28 stem hole
34 wedge piston for retaining the wedge 35
35 wedge
36 jaw of the plier
37 plier union or joint
38 head of the plier
39 bolts
40 roll
42 pliers
43 swivel nut or union nut
46 cover plate

The invention claimed is:

1. A device for pneumatically operating a tool comprising:
a cylinder,
at least two pneumatically actuated pistons serially arranged within said cylinder for generating a translatory force,
a plurality of cylinder covers each associated with one of said pistons,
each piston having a piston rod which is guided in a respective cylinder cover by means of a first lip seal,
a further seal disposed between a front edge of each piston rod and a respective subsequent one of the pistons, and
force transmitting means functionally connected to a last of the pistons for operating the tool.

2. The device of claim 1, wherein said further seal is an O-ring.

3. The device of claim 1, wherein each piston rod extends into a centering recess of the respective subsequent piston.

4. The device of claim 1, wherein each piston is supported by an inner wall of the cylinder by a piston guiding strip.

5. The device of claim 4, wherein each piston is additionally sealed with respect to the inner wall of the cylinder by means of a second lip seal.

6. The device of claim 1, wherein said force transmitting means includes a wedge cooperating with a pair of jaws each having means riding on a side surface of said wedge.

7. The device of claim 6, wherein said wedge is screwed into said last piston and is guided within a tool holder.

8. The device of claim 7, wherein said tool holder is removably connected to the cylinder.

9. Pneumatic pliers for the fitting and pressing of clamp rings, hose clamps, tube clamps, hose clips, lug clamps, comprising the operating device of claim 1.

10. The device of claim 1, wherein said tool is pneumatic pliers.

* * * * *

UNITED STATES PATENT AND TRADEMARK OFFICE

CERTIFICATE OF CORRECTION

PATENT NO. : 7,107,814 B2 
APPLICATION NO. : 10/311365
DATED : September 19, 2006
INVENTOR(S) : Peter Winterhalter and Ulrich Meier It is certified that error appears in the above-identified patent and that said Letters Patent is hereby corrected as shown below:

In column 1, line 13, please delete “78211” and insert -- 782 --.

In column 1, line 16, after the word “the”, please delete “a”.

In column 1, line 41, after the word “to”, please delete “create”.

In column 1, line 56, please delete “inventions” and insert -- invention --.

In column 2, lines 61-63, please delete the spacing between the words “which” and “are”.

In column 3, lines 60-62, please delete the spacing between the words “invention” and “if”.

Signed and Sealed this

Twenty-fourth Day of April, 2007

JON W. DUDAS
*Director of the United States Patent and Trademark Office*